(12) United States Patent
Wakrat et al.

(10) Patent No.: US 8,185,706 B2
(45) Date of Patent: May 22, 2012

(54) COPYBACK OPTIMIZATION FOR MEMORY SYSTEM

(75) Inventors: Nir Jacob Wakrat, San Jose, CA (US); Mark Alan Helm, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 813 days.

(21) Appl. No.: 12/193,638

(22) Filed: Aug. 18, 2008

(65) Prior Publication Data

US 2009/0276560 A1 Nov. 5, 2009

Related U.S. Application Data

(60) Provisional application No. 61/049,330, filed on Apr. 30, 2008.

(51) Int. Cl.
*G06F 12/00* (2006.01)
(52) U.S. Cl. ...................................................... 711/154
(58) Field of Classification Search ........................ None
See application file for complete search history.

(56) References Cited

U.S. PATENT DOCUMENTS

| | | | |
|---|---|---|---|
| 4,020,466 A | 4/1977 | Cordi et al. | |
| 5,732,275 A * | 3/1998 | Kullick et al. ................ | 717/170 |
| 6,601,216 B1 | 7/2003 | Obata | |
| 7,362,611 B2 | 4/2008 | Roohparvar | |
| 2005/0172065 A1* | 8/2005 | Keays ........................... | 711/103 |
| 2006/0050576 A1 | 3/2006 | Kim | |
| 2007/0048715 A1 | 3/2007 | Miyamoto et al. | |
| 2007/0268905 A1* | 11/2007 | Baker et al. ................... | 370/392 |
| 2007/0276863 A1 | 11/2007 | Shenfield | |
| 2008/0288712 A1* | 11/2008 | Cornwell et al. ............. | 711/103 |

FOREIGN PATENT DOCUMENTS

| | | |
|---|---|---|
| EP | 0691614 | 1/1996 |
| TW | 258074 B | 7/2006 |

OTHER PUBLICATIONS

International Search Report and Written Opinion of the International Searching Authority, PCT Application Serial No. PCT/US2009/039160, Oct. 9, 2009, 22 pp.
EP Search Report from European Patent Application No. EP 11 18 3929 dated Dec. 9, 2011, 10 pages.
Korean Notice of Preliminary Rejection from Korean Intellectual Property Office (KIPO) mailed Feb. 22, 2012, 4 pages. (English Translation, 3 pages).

\* cited by examiner

*Primary Examiner* — Duc Doan
(74) *Attorney, Agent, or Firm* — Fish & Richardson P.C.

(57) ABSTRACT

In a copyback or read operation for a non-volatile memory subsystem, data page change indicators are used to manage transfers of data pages between a register in non-volatile memory and a controller that is external to the non-volatile memory.

17 Claims, 8 Drawing Sheets

FIG. 4

COPYBACK OPTIMIZATION FOR MEMORY SYSTEM

RELATED APPLICATION

This application claims the benefit of priority from Provisional Application No. 61/049,330, for "Copyback Optimization for Memory System," filed Apr. 30, 2008, which provisional application is incorporated by reference herein in its entirety.

TECHNICAL FIELD

This subject matter is generally related to memory systems.

BACKGROUND

Flash memory is a type of electrically erasable programmable read-only memory (EEPROM). Because flash memories are non-volatile and relatively dense, they are used to store files and other persistent objects in handheld computers, mobile phones, digital cameras, portable music players, and many other devices in which other storage solutions (e.g., magnetic disks) are inappropriate. When data stored in flash memory is processed, a data page is read out of flash memory and stored in a register. The register contents is transferred to a controller that is external to the non-volatile memory for processing. The processed data page is placed back in the register so that the processed data page can be written back to flash memory.

SUMMARY

In a copyback or read operation for a non-volatile memory subsystem, data page change indicators are used to manage transfers of data pages between a register in non-volatile memory and a controller that is external to the non-volatile memory.

DETAILED DESCRIPTION

Examples of Memory Subsystems

Figure 1A:
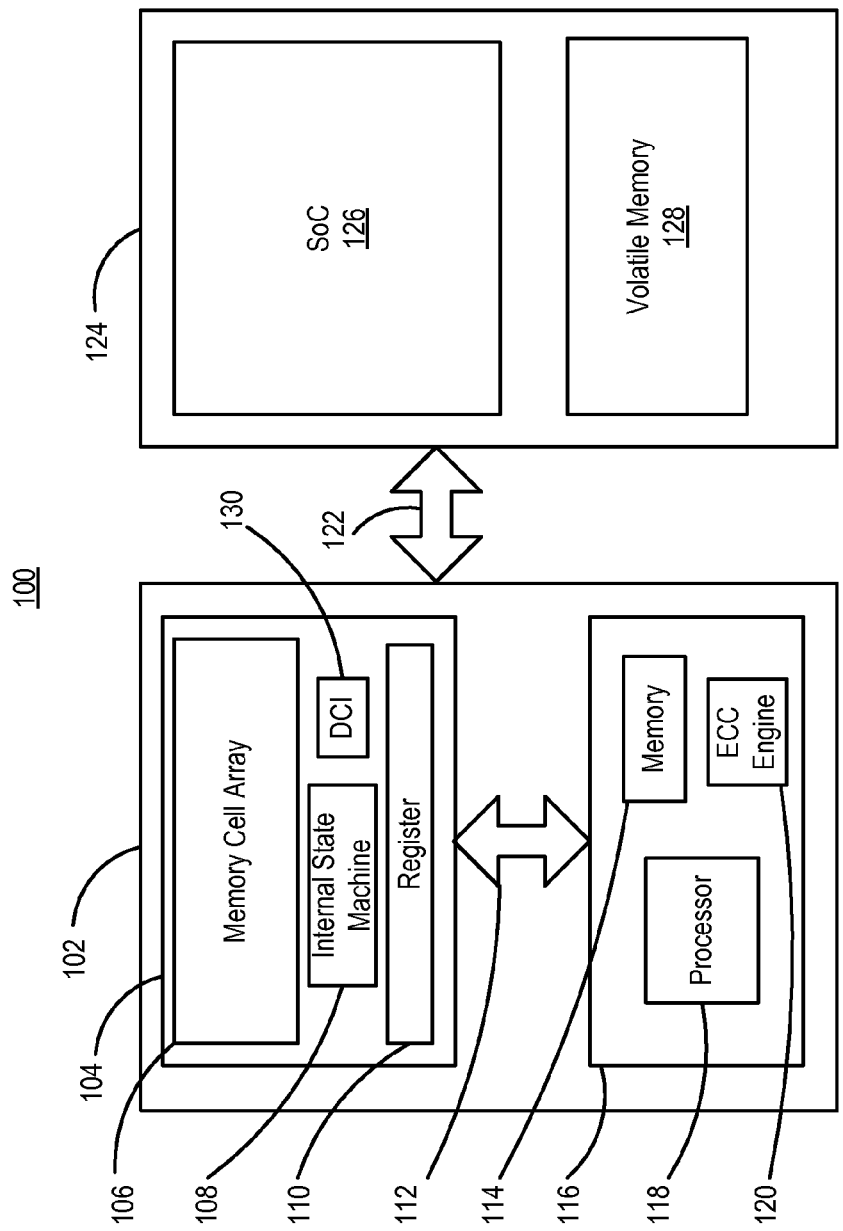
FIG. 1A is a block diagram of an example memory system for implementing an optimized copyback process.

FIG. 1A is a block diagram of an example memory system 100 for implementing an optimized copyback process. In some implementations, the system 100 can include a memory subsystem 102 coupled to a host device 124 through an external bus 122 (e.g., Open NAND Flash Interface (ONFI), ATA). The host device 124 can be any electronic device including but not limited to smart phones, media players, text messaging devices, portable computers, solid state drives, digital cameras, etc. The memory subsystem 102 can be any non-volatile memory subsystem (e.g., managed NAND).

The host device 124 can include a system-on-chip (SoC) 126 and volatile memory 128. The SoC 126 can include hardware and software for interacting with the memory subsystem 102, such as transmitting read and write requests made by applications running on the host device 124.

The memory subsystem 102 can include non-volatile memory 104 (also referred to as "raw memory") and an external controller 116. The memory 104 can include a memory cell array 106, an internal state machine 108, a memory register 110 and data change indicator (DCI) 130. The controller 116 can include a processor 118, volatile memory 114 and error correction code (ECC) engine 120. Other configurations for the memory subsystem 102 are possible. For example, a cache register can be included in the data path between the memory cell array 106 and the memory register 110 to allow the internal state machine to read the next data page from the memory cell array 106 while transferring the current page to the controller 116 over internal bus 112.

Figure 1B:
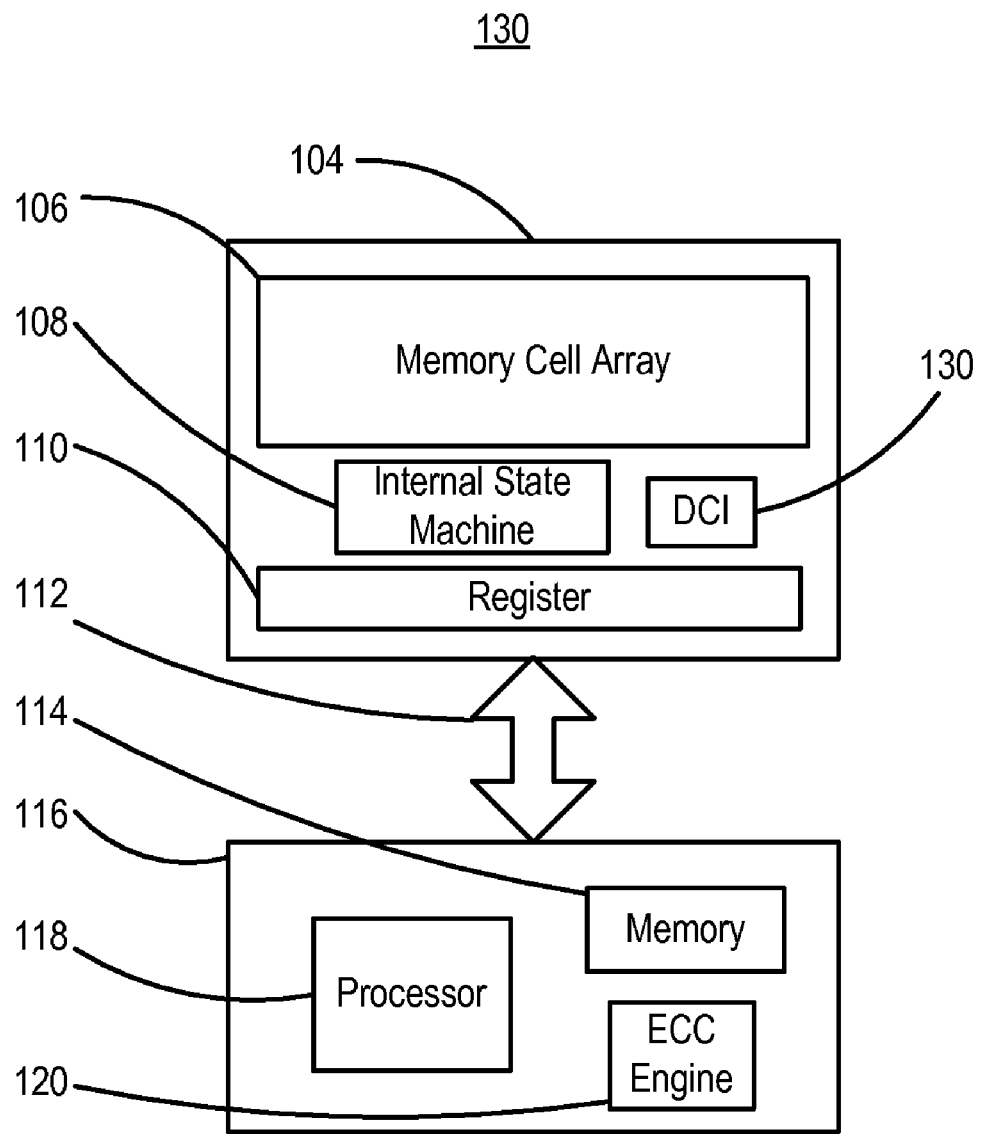
FIG. 1B is a block diagram of another example memory system for implementing an optimized copyback process.

FIG. 1B is a block diagram of another example memory system 130 for implementing an optimized copyback process. The system 130 shows only the memory subsystem 102, the operation of which was described in reference to FIG. 1A.

Copyback Operations

Copyback can be a memory subsystem command to move data from one page to another page. Copyback can be used in wear leveling and other non-volatile memory management operations. In a typical copyback operation, a data page is read from the memory cell array 106 and stored in the memory register 110 by the internal state machine. The external controller 116 reads or clocks the data page out of the memory register 110 so that the processor 118 can perform a desired operation on the data page (e.g., an ECC operation). The processed data page can be written back to the memory register 110 by the controller 116. The internal state machine 108 can write the contents of the memory register 110 into a new data page in the memory cell array 106. By avoiding the transfer of the entire contents of register 110 to the external controller 116, processing times and power consumption can be reduced.

Example Process For Writing New Data Pages

Figure 2:
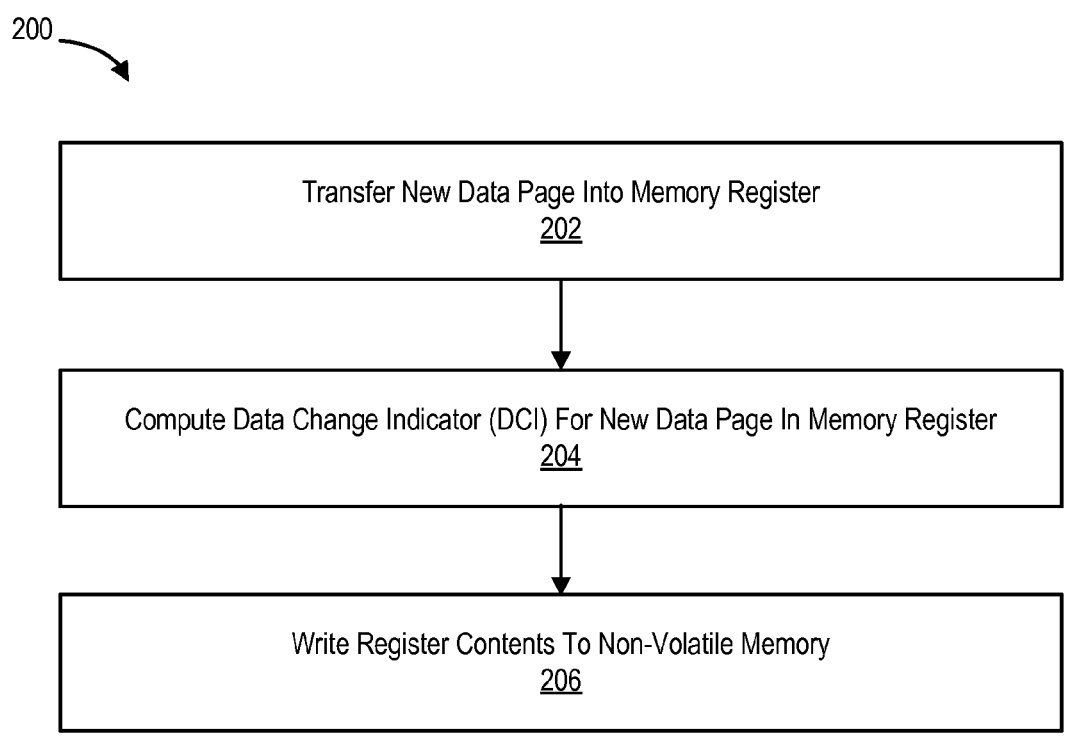
FIG. 2 is a flow diagram of an example optimized copyback process 200 for computing and storing data change indicators used by the memory systems of FIGS. 1A and 1B.

FIG. 2 is a flow diagram of an example optimized copyback process 200 for computing and storing data change indicators used by the memory systems of FIGS. 1A and 1B. In some implementations, the process 200 can begin when new data page is transferred into a memory register of a memory subsystem (202). A DCI can be computed for the data page and stored in the memory subsystem (204). Some examples of data change indicators can include error detection codes (EDCs), including but not limited to: checksum, Hamming code, parity bit, cyclic redundancy check (CRC), polarity symbol reversal, Turbo code, etc. An EDC can also be part of an ECC, such as Reed-Solomon code, Reed-Muller code, Binary Golay code, and low-density parity-check codes. After the DCIs are computed and stored, the register contents can be written to non-volatile memory (206). DCIs can be used for the optimized copyback process described in reference to FIGS. 3A-3C.

Example Optimized Copyback Process

Figure 3A:
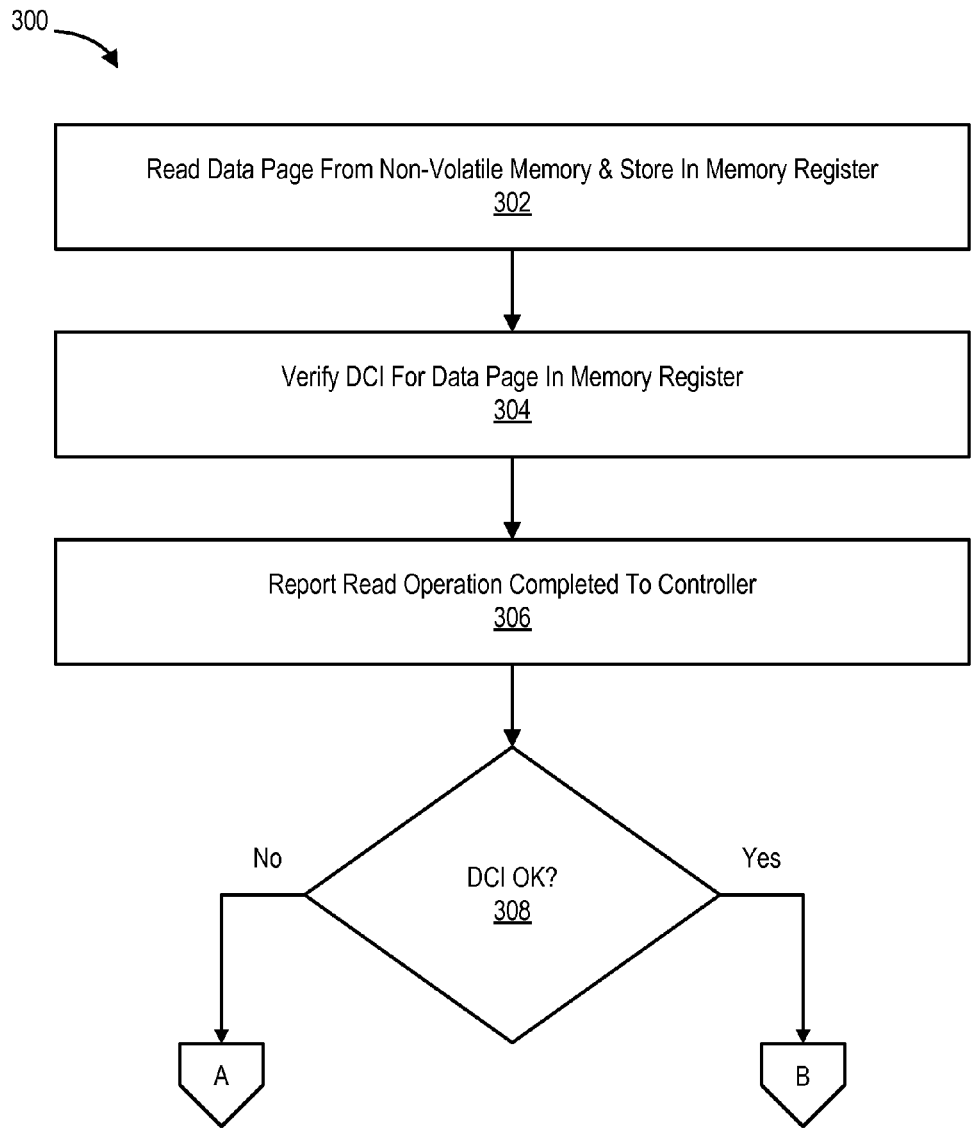
FIGS. 3A-3C are flow diagrams of an example optimized copyback process implemented by the memory systems of FIGS. 1A and 1B.
Figure 3B:
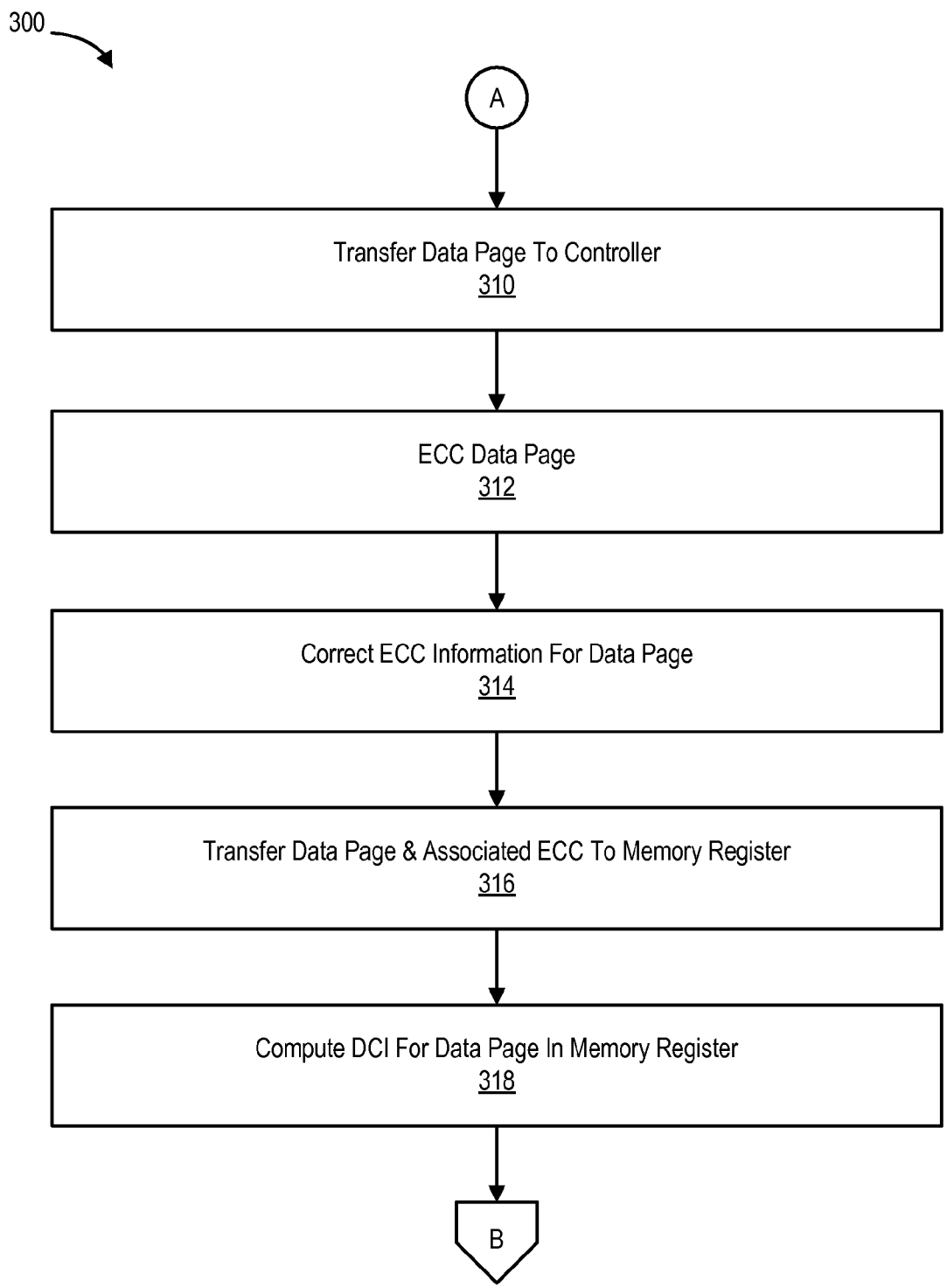
Figure 3C:
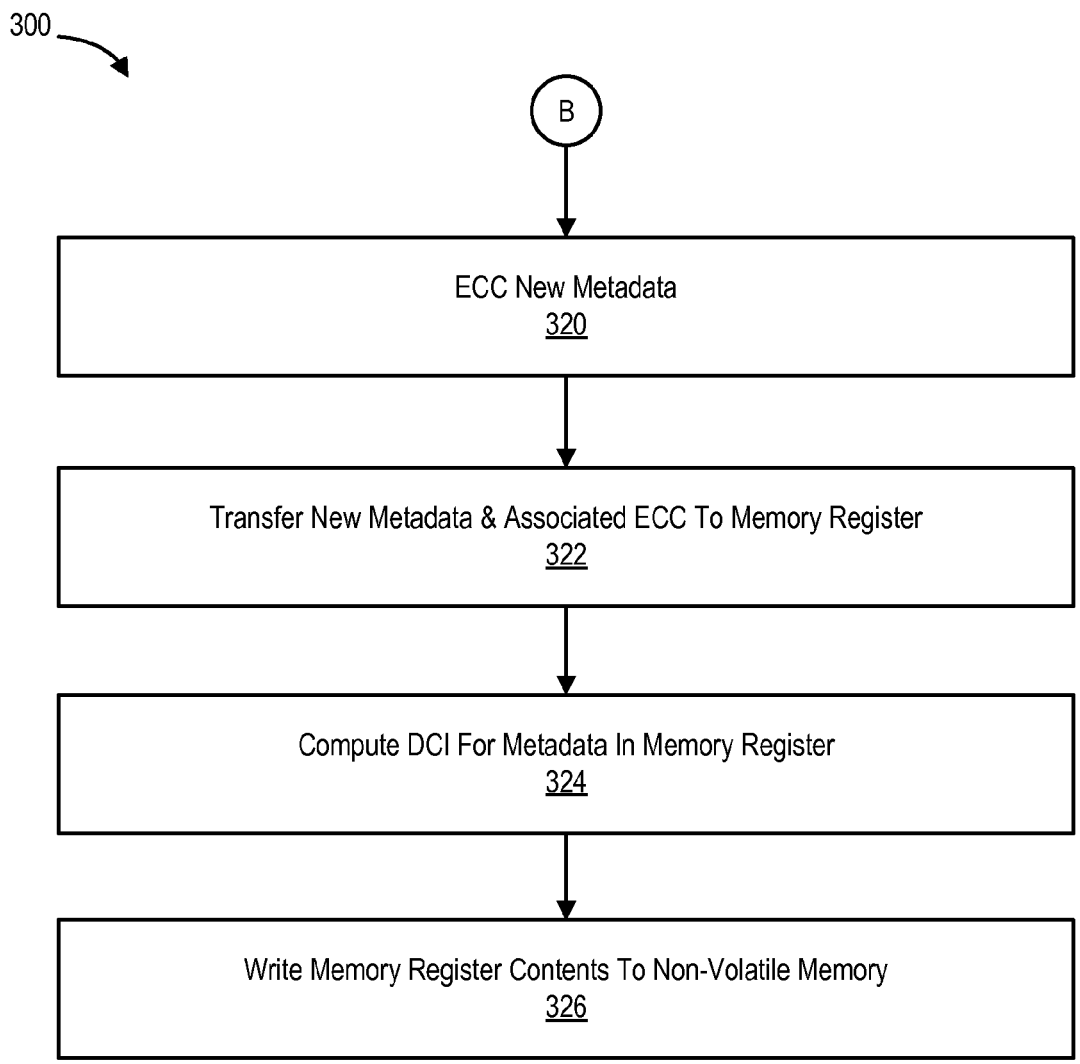

FIGS. 3A-3C are flow diagrams of an example optimized copyback process 300 implemented by the memory systems of FIGS. 1A and 1B. In some implementations, the process 300 can begin by reading a data page from non-volatile memory (e.g., memory cell array 106) and storing the data page in a memory register (302) (e.g., register 110). A DCI (e.g., DCI 130) can be verified for the data page in the memory register (304). In some implementations, the DCI can be previously computed and stored in the memory subsystem when the data page is first written to non-volatile memory (e.g., using process 200). In other implementations, the DCI can be computed "on the fly" as part of the read operation or as a separate operation. The memory subsystem can report to an external controller (e.g., external controller 116) that the read operation has completed (306).

If the DCI for the data page in the register indicates that the data page has changed (308), the data page can be transferred to the external controller (310), an ECC can be computed for the data page (312) and the ECC information for the data page can be corrected in the external controller (314). The data page and associated ECC can be transferred back to the memory register (316). A new DCI can be computed for the data page in the memory register (318).

If the DCI for the data page in the register indicates that the data page has not changed (308), an ECC can be computed for new metadata associated with the data page (320). The new metadata and associated ECC can be transferred to the memory register (322). A new DCI can be computed for the metadata in the memory register (324). The memory register contents can be written to a new data page in non-volatile memory (326).

Optimized Read Operation

Figure 4:
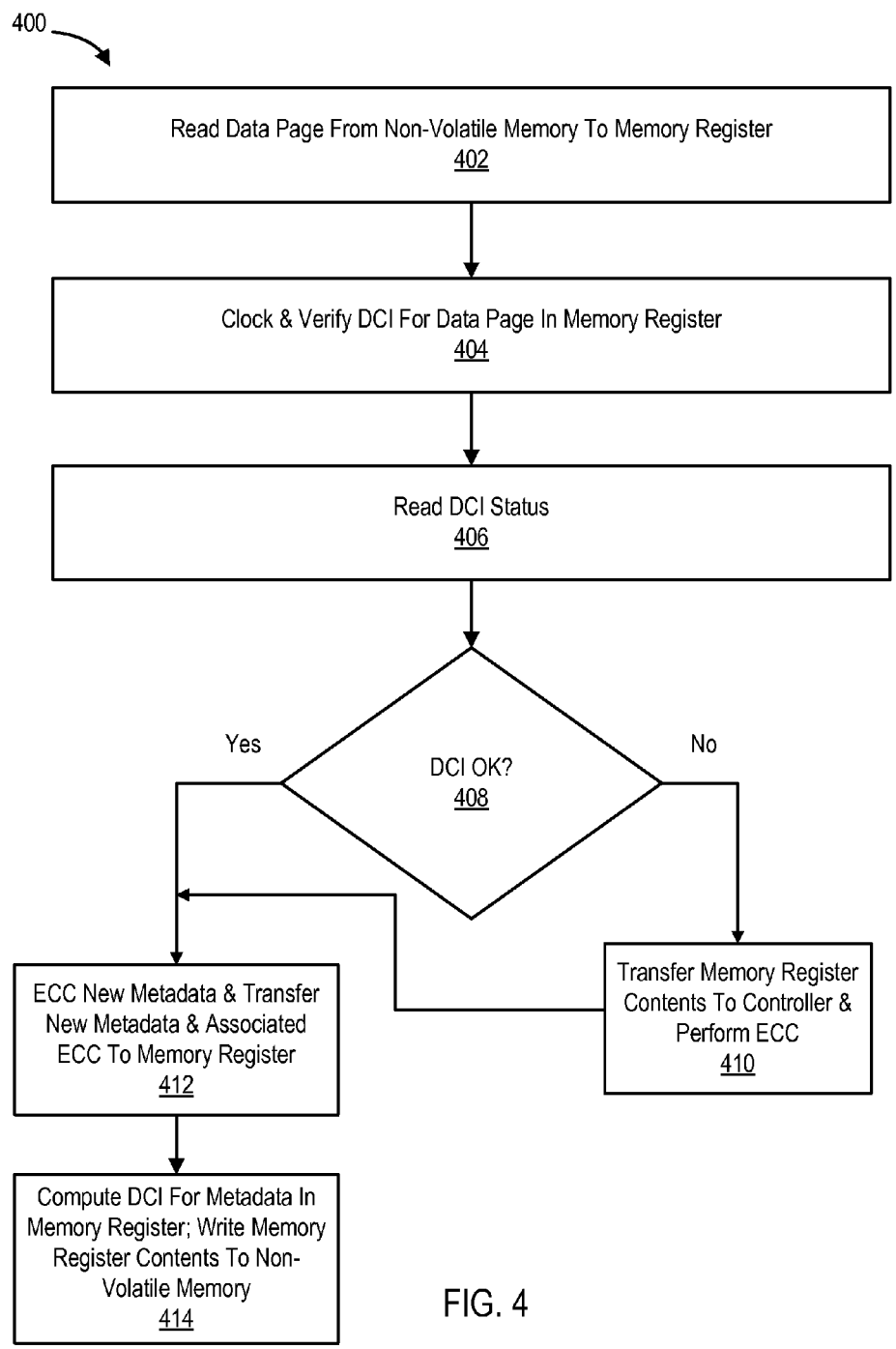
FIG. 4 is a flow diagram of an example optimized read operation implemented by the memory systems of FIGS. 1A and 1B.

FIG. 4 is a flow diagram of an example optimized read operation implemented by the memory systems of FIGS. 1A and 1B. In some implementations, the process 400 can begin by reading a data page from non-volatile memory and storing the data page in a memory register (402). A pre-computed DCI associated with the data page can be clocked into the memory register from a storage location in the memory subsystem and verified (404). The DCI can also be computed "on the fly." The status of the DCI can be read to determine if the data page has changed (406).

If the data page has changed (408), an ECC for the new metadata associated with the data page can be computed and transferred, together with the new metadata to the memory register (412). A new DCI can be computed for the metadata in the memory register and the register contents can be written to a new data page in non-volatile memory (414).

If the data page has not changed (408), the memory register contents can be transferred to an external controller and an ECC can be computed by the external controller (410). An ECC for the new metadata associated with the data page can be computed and transferred by the external controller, together with the new metadata to the memory register (412). A new DCI can be computed for the metadata in the memory register and the register contents can be written to a new data page in non-volatile memory (414).

Example Data Structures

Figure 5:
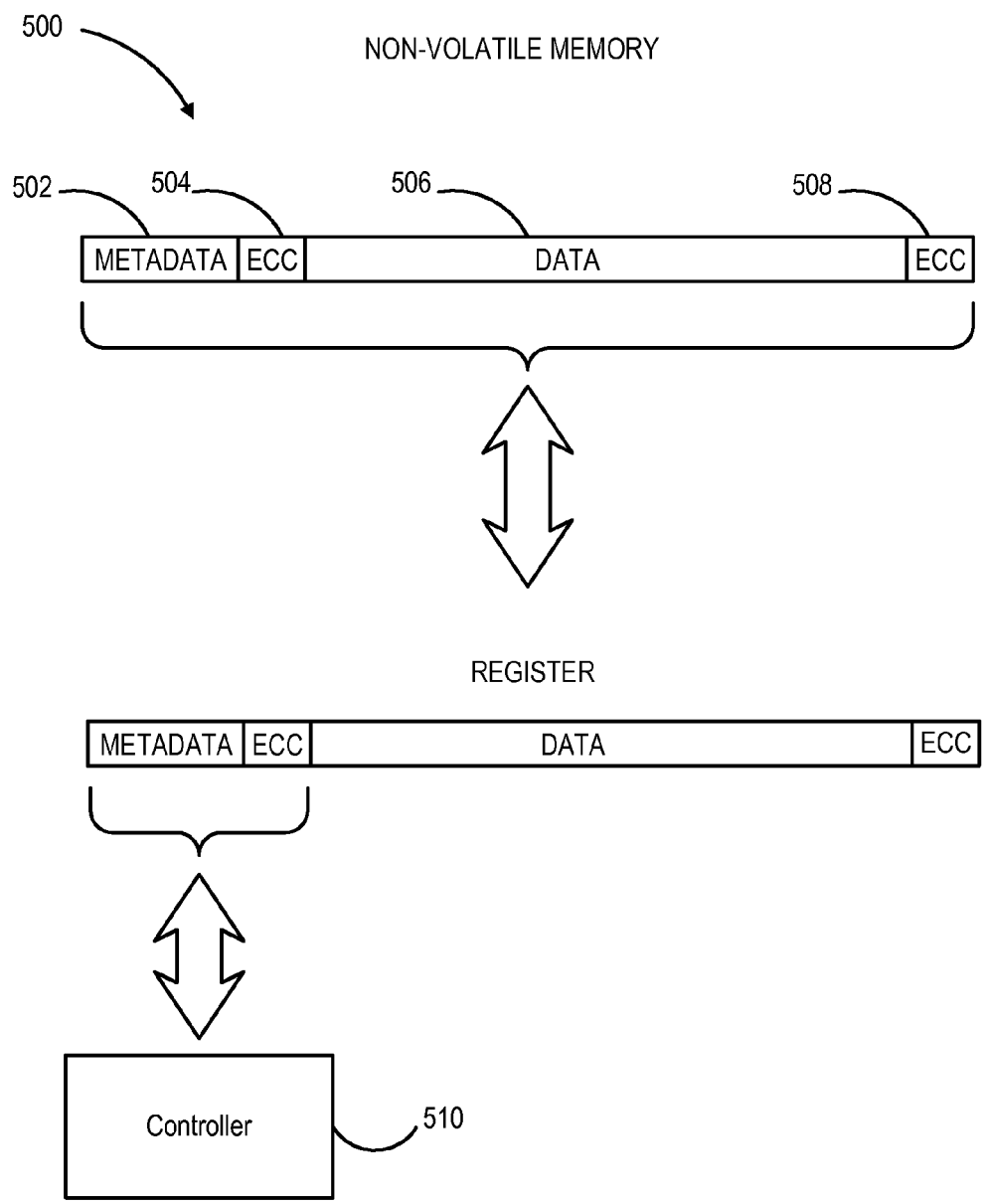
FIG. 5 illustrates example data structures used by the copyback process of FIGS. 3A-3C.

FIG. 5 illustrates example data structures used by the copyback process of FIGS. 3A-3C. In the example shown, a data page 500 in non-volatile memory includes metadata 502, metadata ECC 504, data 506 and data ECC 508. If the data has not changed than only the metadata 502 and the metadata ECC 504 are transferred from the register to the external controller 510 for processing. The processed metadata 502 and metadata ECC 504 are transferred back to the memory subsystem and stored in the memory register. The data page can the be written to a new data page in non-volatile memory (e.g., a memory cell array).

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
   obtaining a data page from non-volatile memory of a memory subsystem;
   storing the data page in a register;
   determining when the data page stored in the register has changed including reading a data change indicator associated with the data page;
   when the data change indicator indicates that the data page has changed, sending the data page to a controller for processing including:
   determining an error-related parameter associated with the data page,
   correcting, by the controller, the error-related parameter, and
   storing the data page and the corrected error-related parameter in the register; and
   when the data change indicator indicates that the data page stored in the register is unchanged, sending metadata associated with the data page to the controller for processing including:
   generating an error-related parameter associated with the metadata, and
   storing the generated error-related parameter associated with the metadata in the register; and
   writing contents in the register including the generated error-related parameter associated with the metadata stored in the register to a new data page in the non-volatile memory.

2. The method of claim 1, where the reading the data change indicator includes reading data associated with an error detection code.

3. The method of claim 1, where determining when the data page has changed, further comprises:
   computing a data change indicator associated with the data page; and
   determining if the data page has changed including reading the computed data change indicator.

4. The method of claim 1, further comprising;
   correcting the error-related parameter associated with the metadata associated with the data page prior to storing the data page and the corrected error-related parameter associated with the metadata in the register.

5. The method of claim 1, further comprising determining a new data change indicator based on the data page and the corrected error-related parameter stored in the register.

6. A system comprising:
an interface adapted for coupling to a controller;
non-volatile memory;
a processor coupled to the non-volatile memory and the interface, the processor operable to perform one or more functions comprising:
obtaining a data page from the non-volatile memory;
storing the data page in a register;
determining when the data page stored in the register has changed including reading a data change indicator associated with the data page;
when the data change indicator indicates that the data page has changed, sending the data page through the interface to a controller for processing including:
  determining an error-related parameter associated with the data page,
  correcting, by the controller, the error-related parameter, and
  storing the data page and the corrected error-related parameter in the register; and
when the data change indicator indicates that the data page stored in the register is unchanged, sending metadata associated with the data page to the controller for processing including:
  generating an error-related parameter associated with the metadata, and
  storing the generated error-related parameter associated with the metadata in the register; and
  writing contents in the register including the generated error-related parameter associated with the metadata stored in the register to a new data page in the non-volatile memory.

7. The system of claim 6, where reading the data change indicator includes reading data associated with an error detection code.

8. The system of claim 6, where determining the data page has changed further comprises:
computing the data change indicator associated with the data page; and
determining when the data page has changed including reading the computer data change indicator.

9. The system of claim 6, where the processor is operable to perform one or more functions comprising:
when the data change indicator indicates that the data page stored in the register is unchanged, sending metadata associated with the data page to the controller for processing including:
  determining an error-related parameter associated with the metadata, and
  storing the data page and the error-related parameter associated with the metadata in the register; and
writing contents in the register including the data page and the error-related parameter associated with the metadata stored in the register to a new data page in the non-volatile memory.

10. A method comprising:
obtaining a data page and associated metadata from non-volatile memory of a memory subsystem coupled to a controller;
storing the data page in a register of the memory subsystem;
sending the data page and associated metadata to the controller for processing;
receiving a processed data page and associated metadata from the controller;
determining whether the processed data page has changed;
when it is determined that the processed data page has changed:
  writing the processed data page and the associated metadata to the register in the memory subsystem, and
  writing contents in the register to the non-volatile memory; or
when it is determined that the processed data page has not changed:
  writing the associated metadata to the register in the memory subsystem, and
  writing contents in the register to the non-volatile memory.

11. The method of claim 10, where determining when the processed data page has changed, further comprises:
reading a data change indicator for the processed data page.

12. The method of claim 11, where the data change indicator is associated with an error detection code.

13. The method of claim 10, where determining if the processed data page has changed, further comprises:
computing a data change indicator for the processed data page; and
determining if the processed data page has changed based on the data change indicator.

14. A system comprising:
an interface adapted for coupling to a controller;
non-volatile memory;
a processor coupled to the non-volatile memory and the interface, the processor operable for obtaining a data page and associated metadata from non-volatile memory of a memory subsystem coupled to the controller;
storing the data page in a register of the memory system;
sending the data page and associated metadata through the interface to the controller for processing;
receiving a processed data page and associated metadata from the controller through the interface;
determining whether the processed data page has changed;
when it is determined that the processed data page has changed:
  transferring the processed data page and associated metadata to the register in the memory subsystem, and
  writing contents in the register to the non-volatile memory; or
when it is determined that the processed data page has not changed:
  transferring the processed metadata to the register in the memory subsystem, and
  writing contents in the register to the non-volatile memory.

15. The system of claim 14, where determining when the processed data page has changed, further comprises:
reading a data change indicator for the processed data page.

16. The system of claim 15, where the data change indicator is associated with an error detection code.

17. The system of claim 14, where determining if the processed data page has changed, further comprises:
computing a data change indicator for the processed data page; and
determining when the processed data page has changed based on the data change indicator.

* * * * *